Aug. 10, 1926.
J. F. HABERER
CAB BODY
Filed May 14, 1924    4 Sheets-Sheet 1
1,595,298
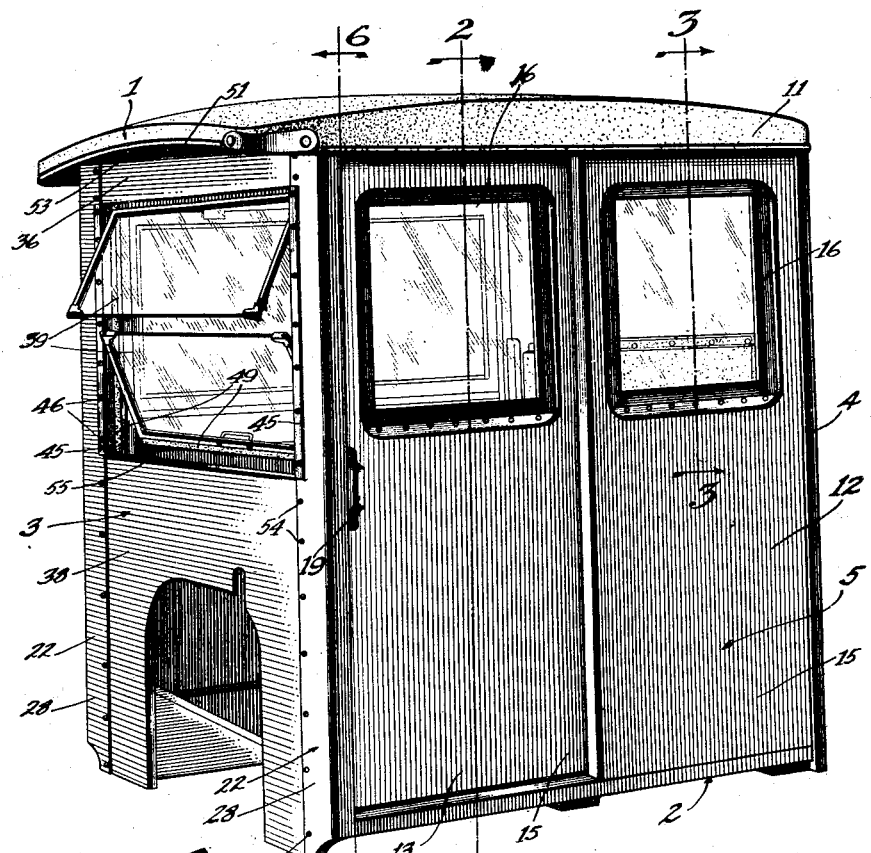
Fig.1
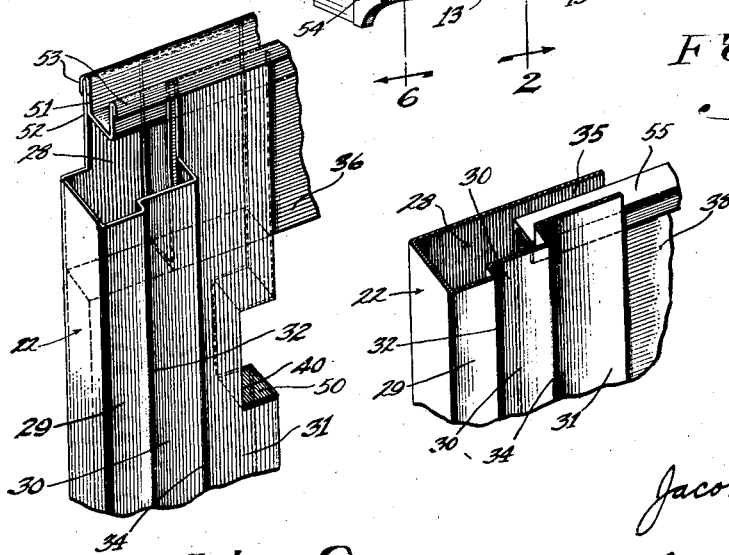
Fig.8
Fig.9
Inventor
Jacob F. Haberer
By
Attorneys

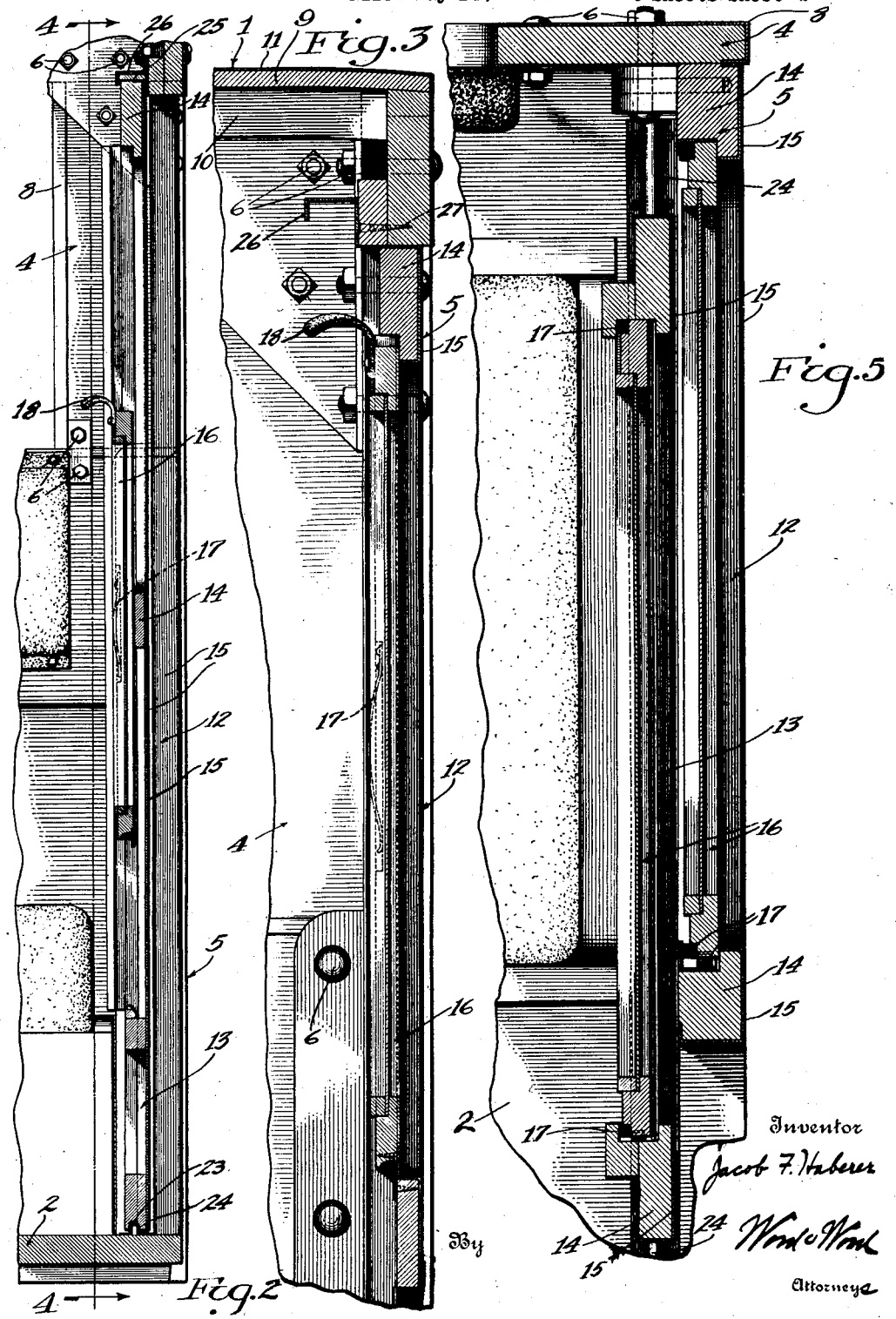

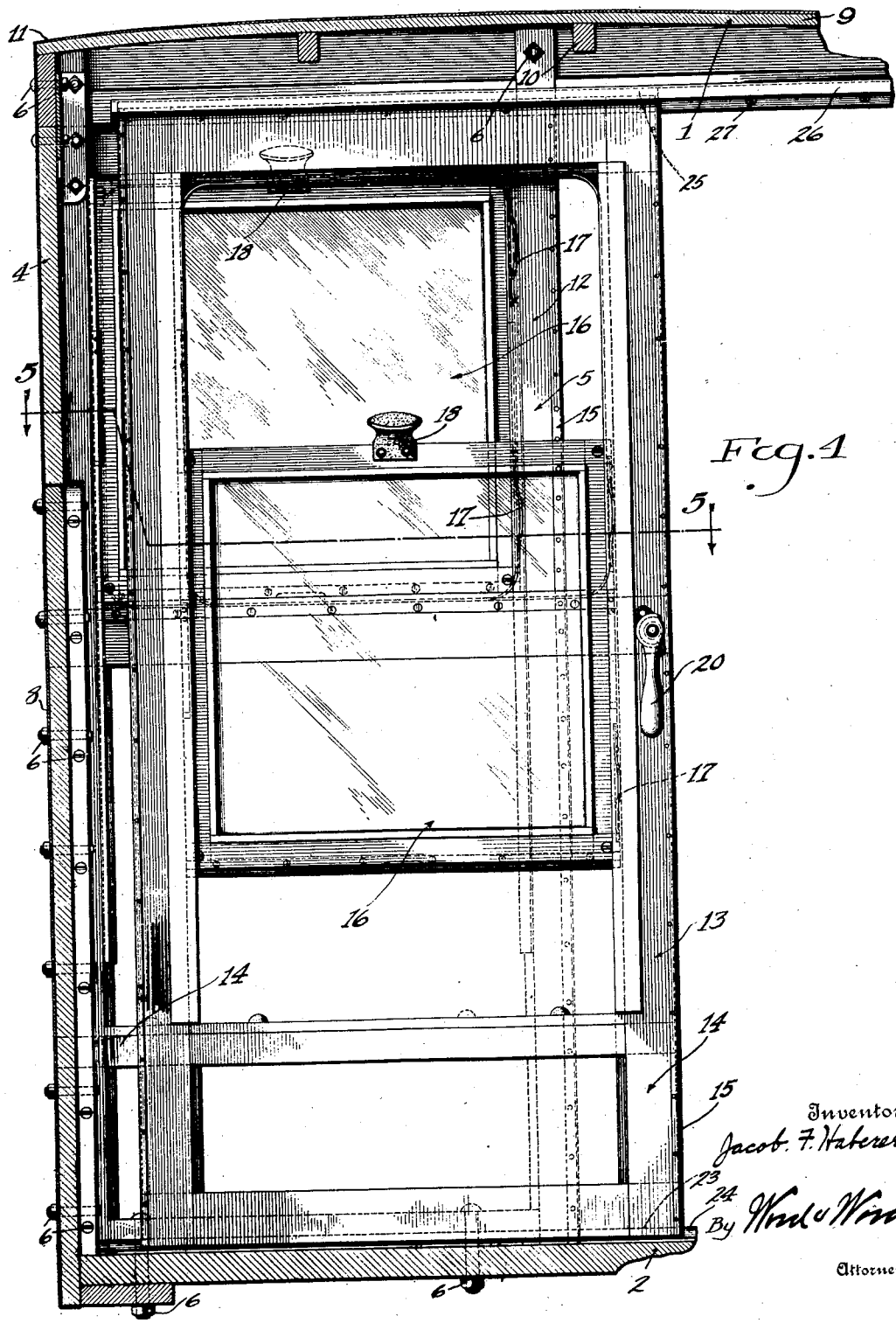

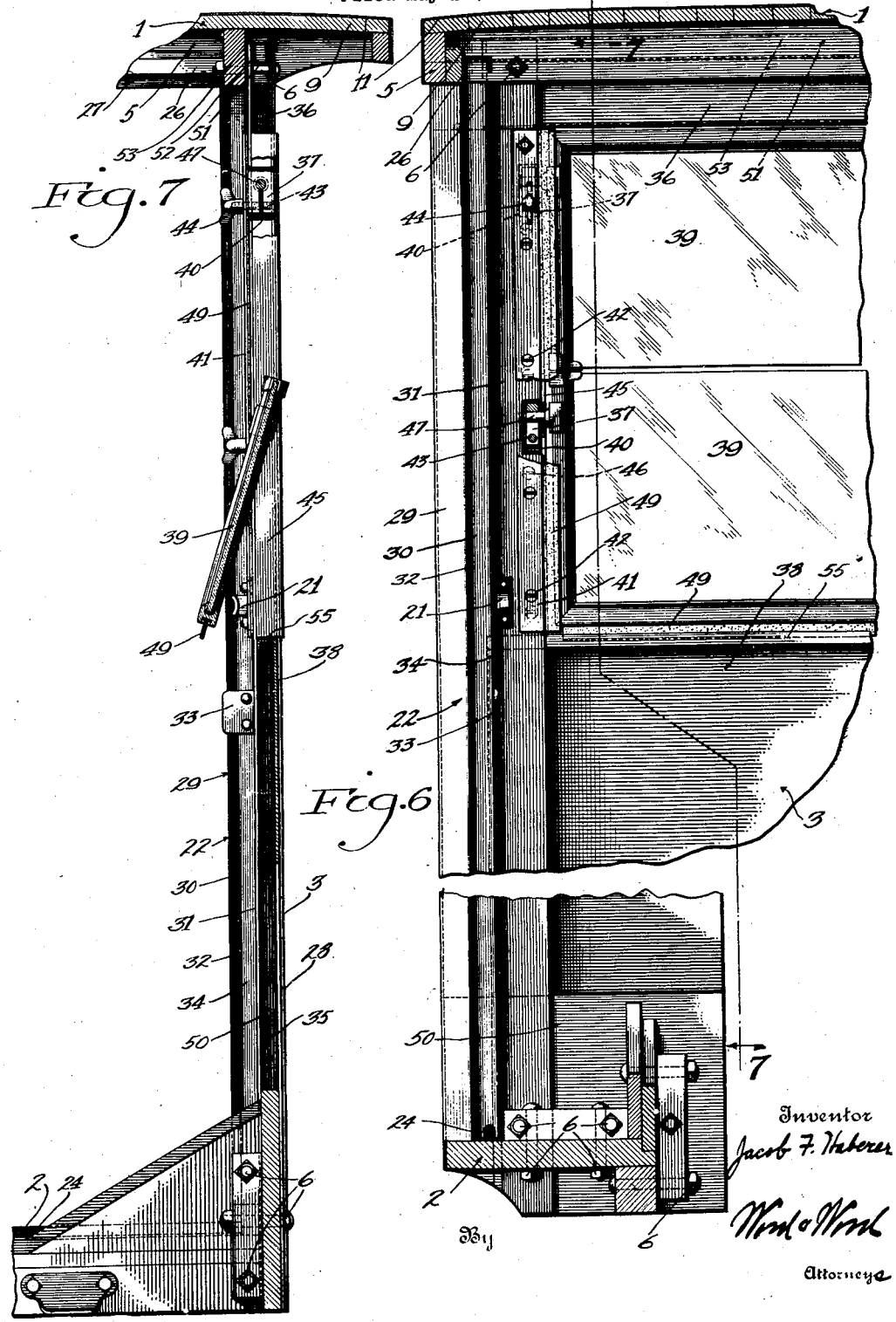

Patented Aug. 10, 1926.

1,595,298

UNITED STATES PATENT OFFICE.

JACOB F. HABERER, OF CINCINNATI, OHIO.

CAB BODY.

Application filed May 14, 1924. Serial No. 713,332.

My invention relates to cab bodies and is particularly directed to enclosed cab bodies of sheet metal structure for commercial motor vehicles.

One object of my invention is to provide a cab body of general sheet metal structure which will have two sliding doors, one on either side, said sliding doors being adapted to slide on the inside of the side wall of the cab.

Another object of my invention is to provide a sheet metal cab having front corner frames which will serve as supports for the top of the cab, jambs for the sliding doors and mountings for the windshield and apron.

Another object of my invention will provide a sheet metal cab body with inside sliding doors aligned with door jambs provided by the front corner frames.

Another object of my invention is to provide a staunch, easily assembled and economical sheet metal cab body construction, of pleasing appearance.

Other objects and certain advantages will appear in the description of drawings forming a part of this specification, of which:

Figure 1 is a perspective view of the cab.

Figure 2 is an enlarged section on line 2—2, of Fig. 1.

Figure 3 is an enlarged section on line 3—3, of Fig. 1.

Figure 4 is a section on line 4—4, of Fig. 2.

Figure 5 is an enlarged section on line 5—5, of Fig. 4.

Figure 6 is an enlarged section on line 6—6, of Fig. 1.

Figure 7 is a section on line 7—7, of Fig. 6.

Figure 8 is a detailed perspective view of the connection of the apron to the corner frame.

Figure 9 is a perspective of the top of one of the corner frames.

The cab body is rectangular in shape and has a top 1, bottom 2, front 3, back 4 and sides 5. These elements are conventionally secured together except as otherwise specified by a plurality of fastening devices 6. In like manner the cab body is anchored on the chassis (not shown), and my construction is designed to permit said body to have all the features usual and conventional in a cab body for commercial motor vehicles.

The top 1, bottom 2 and back 4 may be of any desired material or construction, but it is found preferable to make back of sheet metal 8, whereas the top and bottom can best be made of a plurality of strips 9 of wood secured together by wooden braces 10. The top of the cab is covered with a layer of water-proofing material 11.

The front 3 and sides 5 of my cab are of sheet metal and their novel construction and design taken in combination with the rest of the cab and the vehicle on which it is to be used, constitutes the primary feature of novelty in my improved cab.

Each side wall of my cab comprises a panel portion 12 and a door 13. The panel portion is of such length that the door can slide beside it a sufficient distance to permit the driver or attendant to have free access to the interior of the cab. The panels and doors are both formed by covering a wooden frame 14 with sheet metal 15 and bending said sheet metal around the corners to provide a structure which will be substantially water-tight and present no rough edges exteriorly.

In order that the cab may be used in both summer and winter, each door and each panel is provided with a window 16 conventional in design, adjustably secured by the usual springs 17 and having handles 18 for raising and lowering it. The doors and panels are of sufficient thickness to permit the windows to be lowered vertically within the outlines of the same.

The doors are counter-sunk so that they can slide on the inside of said panel portions. These doors are provided with outside handles 19 and inside hooks 20, the latter operating with members 21 on the backs of the front corner frames 22 for securing these doors 13 in a closed position from the inside of the cab. The doors have grooves 23 at their bottoms which are adapted to slide upon rails 24 fastened to the bottom of the cab body. Leather or fibrous strips 25 wider than the doors are secured to the tops of the doors to provide proper bearing surfaces for the contact of the tops of the doors to provide proper bearing surfaces for the contact of the tops of the doors with guide rails 26 of rectangular U-shape, which are attached to the top of the cab body by means of screws 27. This construction prevents vibration, rattling and keeps the door in a set position.

The front corner frames are of novel structure, each frame consisting of a single sheet of metal folded to provide a one-plane front 28 and a back comprising three offsets. The outer of these offsets, 29, defines what may be considered a vertical post, the purpose of which is to support the top of the cab. The middle of these offsets, 30, is aligned with the guide rails 24, 26, of the sliding door and serves as a jamb. The door fits tightly against this jamb and is held against the shoulder 32 between the outer offset 29 and the jamb 30 by means of a clip 33 attached to the shoulder 34 of the jamb itself. Thus a very tight, waterproof, non-rattling construction is provided. The inside, or third offset, 31, constitutes the rear wall of a channel 35, the one-plane front 28 being the other wall of the same. In this channel 35 are located the brace 36 for securing the frames 22 together at their tops, the windshield fasteners 37 below the brace 36 and the apron 38 at the bottom.

In the drawing, two pivotally mounted windshields 39 are disclosed and the channels have notches 40 for the pivotal windshield fasteners 37. The fasteners themselves are of conventional split design covered by metallic strips 41 which extend vertically along the edges of the frames and are secured thereto by means of screws 42. Through the split portions of the fasteners 37 and through the metallic strips 41 extends the studs 43. On the ends of these are screwed winged nuts 44, thus tightening these winged nuts clamps the windshield securely. The fronts of the notches and the channel openings are covered by angle irons 45, which are held in place by screws 46, and these angle irons 45 provide bearing surfaces for the windshield pivots 47. The windshields carry at their edges rubber strips 49 usual with windshields, which keep the wind and rain from the interior of the cab.

In order to secure greater staunchness, certain portions of the hollow frames are blocked with wood 50. This not only provides more secure anchorage for all attachments, but prevents all tendency of the frames to warp, or the parts to rattle.

Extending between the two corner frames and at their top, is the brace 36 comprising a U-shaped piece of sheet metal mounted in the channels, and having its sides riveted to the walls of the channels respectively. In order to prevent rain or other moisture from penetrating the sheet metal structure, a second strip 51 extends across the top of the frames 22 and the brace 36 between. This latter strip is also U-shaped, and set down into what may be called the top channel 52 and is secured by having its edges 53 turned over and bent back upon the walls of the top channel. In the channels 35 provided by the corner frames and below the windshield, the apron 38 is suitably fastened to the front wall as at 54. The top 55 of the apron is bent backwardly at a right angle across the channel and then turned down in the channel. This construction presents a neat appearance and prevents water running down the channel. This apron extends approximately to the windshield, but in no way serves as a support for the windshield, since the latter, as before pointed out, is pivotally secured at its sides.

Thus I provide a cab body for commercial motor vehicles, capable of having all the features at present usual and customary in such a body. In addition, I provide numerous novel and highly desirable features including: A cab body of general sheet metal structure, inside sliding cab doors, four windows, two on either side, which can be easily raised or lowered without regard to the position of the doors, a water-tight door jamb and front corner frames, with inwardly fastening channels in which may be readily mounted the various elements of the cab front.

The one-piece sheet metal hollow corner frames or posts herein disclosed in combination with the correlated parts not only provide an economical and staunch structure but the design effect is pleasing, the characteristic appearance of the cab from the side being a sliding door which is countersunk in relation to the plane of the panel and the side wall of the corner frame. With regard to these novel features, in combination with a cab body for commercial motor vehicles, I wish to be limited only by my claims.

Having described my invention, I claim:

1. A front for a cab for commercial motor vehicles, comprising front corner frames having inwardly facing channels, a brace at the top mounted in said channels and connecting said front corner frames, notches in said channels, pivotal windshield mountings in said notches, vertically extending strips on the outside of said channels attached thereto, covering said notches and windshield mountings, and an apron in said channel below said windshield and spaced therefrom sufficiently for clearance.

2. A cab of the class described, having side panels and doors sliding upon the inside thereof, the combination of sheet metal, one-piece, hollow corner post-frames, providing front channels adapted to marginally support inserted windshields and apron, said frame providing offset portions upon the side of the cab constituting door jambs rendering the sliding doors countersunk in relation to said panels and the outer side walls of said frames, and top and bottom door guides aligned with the jamb sections respectively of said corner post-frames.

3. A front for a cab for commercial motor vehicles, comprising front corner frames having inwardly facing channels, a brace at the top mounted in said channels and connecting said front corner frames, notches in said channels, pivotal windshield fasteners in said notches, vertically extending strips on the rear and angle irons on the front of the outside of said channels and attached thereto thus closing said channels for covering said notches and windshield mountings, and an apron mounted in said channel.

4. In a cab of the class described, side panels and doors sliding upon the inside thereof, one piece hollow front corner frames providing inwardly facing channels, an apron between and secured within said channels, said corner frames comprising a one plane front and offset portions at their rear sides as door jambs for countersinking the sliding doors in relation to the corner frames and side panels, windshields between said corner frames and above said apron, said windshields having pivots disposed within the channels and windshield pivot clamps mounted within the channels and upon the pivots for clamping the windshields.

5. A front for cabs comprising one piece hollow front corner frames, providing inwardly facing channels, an apron between and secured within said channels, vertically extending strips secured to said corner frames and closing the channel sides of the corner frames above the apron, windshields pivotally mounted in said strips, pivot clamps mounted within the channel of the corner frames and upon the windshield pivots and pivot clamp screws extending from the rear sides of the corner frames.

In witness whereof, I hereunto subscribe my name.

JACOB F. HABERER.